US012574225B2

(12) United States Patent　　(10) Patent No.:　US 12,574,225 B2
Lord　　(45) Date of Patent:　　Mar. 10, 2026

(54) SPATIAL QKD USING MULTIPLE QUANTUM CHANNELS

(71) Applicant: BRITISH TELECOMMUNICATIONS PUBLIC LIMITED COMPANY, London (GB)

(72) Inventor: Andrew Lord, London (GB)

(73) Assignee: BRITISH TELECOMMUNICATIONS PUBLIC LIMITED COMPANY, London (GB)

(*) Notice: Subject to any disclaimer, the term of this patent is extended or adjusted under 35 U.S.C. 154(b) by 63 days.

(21) Appl. No.: 18/579,796

(22) PCT Filed: Jul. 13, 2022

(86) PCT No.: PCT/EP2022/069591
　　§ 371 (c)(1),
　　(2) Date: Jan. 16, 2024

(87) PCT Pub. No.: WO2023/006426
　　PCT Pub. Date: Feb. 2, 2023

(65) Prior Publication Data
　　US 2024/0348431 A1　　Oct. 17, 2024

(30) Foreign Application Priority Data
　　Jul. 30, 2021　　(GB) ...................................... 2110994

(51) Int. Cl.
　　*H04L 9/08*　　(2006.01)
(52) U.S. Cl.
　　CPC .......... *H04L 9/0852* (2013.01); *H04L 9/0819* (2013.01); *H04L 9/0838* (2013.01)
(58) Field of Classification Search
　　CPC .... H04L 9/0852; H04L 9/0819; H04L 9/0838
　　See application file for complete search history.

(56) References Cited

U.S. PATENT DOCUMENTS

2002/0097874 A1　　7/2002　Foden et al.
2010/0027794 A1*　2/2010　Yuan ....................... H04L 9/002
　　　　　　　　　　　　　　　　　　380/278

(Continued)

FOREIGN PATENT DOCUMENTS

GB　　　2430123　B　　1/2008
GB　　　2534917　A　　8/2016
GB　　　2536248　A　　9/2016

OTHER PUBLICATIONS

"Combined Search and Examination Report under Sections 17 and 18(3) for Great Britain Application No. 2110994.7, mailed May 3, 2022", 10 pages.

(Continued)

*Primary Examiner* — Baotran N To
(74) *Attorney, Agent, or Firm* — EIP US LLP

(57)　　　　ABSTRACT

A method of performing Quantum Key Distribution can include quantum transmission in a first basis state and in a second basis state being non-orthogonal to the first basis state, from a quantum transmission apparatus to a quantum receiving apparatus over two pairs of optical channels, wherein transmitting in the first basis state includes, at a first time slot, transmitting a photon over a first channel of the first pair and transmitting no photon over a second channel of the first pair, and, at a subsequent time slot, transmitting a photon over the first channel of the first pair, and transmitting a photon over the second channel of the first pair, wherein transmission in the second basis state includes transmitting a first portion of a probability distribution of a photon from the quantum transmission apparatus to the quantum receiving apparatus; and transmitting a second portion of a probability distribution of the photon from the quantum transmission apparatus to the quantum receiving apparatus.

11 Claims, 2 Drawing Sheets

(56)                    References Cited

U.S. PATENT DOCUMENTS

| | | | | |
|---|---|---|---|---|
| 2016/0234018 A1* | 8/2016 | Frohlich | ............... | H04B 10/70 |
| 2017/0237666 A1 | 8/2017 | Ochi et al. | | |
| 2018/0062838 A1* | 3/2018 | Godfrey | ............... | H04L 9/0852 |

OTHER PUBLICATIONS

"Examination Report under 18(3) for Great Britain Patent Application No. 2001339.7, mailed on Jun. 6, 2022", 3 pages.
"Examination Report under 18(3) for Great Britain Patent Application No. 2001339.7, mailed on Nov. 30, 2021", 3 pages.
"Extended European Search Report for Application No. 20154838.5, mailed on Jun. 23, 2020", 5 pages.
"International Preliminary Report on Patentability for PCT Patent Application No. PCT/EP2021/050643, mailed on Aug. 11, 2022", 10 pages.
"International Search Report and Written Opinion for Application No. PCT/EP2022/069591, mailed on Nov. 7, 2022", 10 pages.
"International Search Report and Written Opinion for PCT Patent Application No. PCT/EP2021/050643 mailed on Feb. 25, 2021", 12 pages.
"Search Report under Section 17(5) for Great Britain Patent Application No. 2001339.7, mailed on Oct. 27, 2020", 4 pages.
Bennett , et al., "Quantum Cryptography: Public Key Distribution and Coin Tossing", Theoretical Computer Science, vol. 560, 2014, pp. 7-11.
Bennett , et al., "Quantum Cryptography: Public Key Distribution and Coin Tossing", In Proceedings of IEEE International Conference on Computers, Systems and Signal Processing, Dec. 10-12, 1984, 7 pages.
Gobby , et al., "Quantum Key Distribution Over 122 Km of Standard Telecom Fiber", Applied Physics Letters, vol. 84, 2004, 3762-3764 (pp. 1-14).
Hugues , et al., "Monitoring And Physical-Layer Attack Mitigation In SON-Controlled Quantum Key Distribution Networks", Journal of Optical Communications and Networking, IEEE, vol. 11, No. 2, Feb. 2019, 10 pages.
Zhang , et al., "Generalized PPM-based BB84 QKD Protocol", Disclosure 3: ICTON 2014 Tu.B1 .5, 2014, pp. 1-4.

* cited by examiner

SPATIAL QKD USING MULTIPLE QUANTUM CHANNELS

PRIORITY CLAIM

The present application is a National Phase entry of PCT Application No. PCT/EP2022/069591, filed Jul. 13, 2022, which claims priority from GB Application No. 2110994.7, filed Jul. 30, 2021, each of which hereby fully incorporated herein by reference.

BACKGROUND

Quantum Key Distribution (QKD) is a method for distributing a secret quantum key between two parties. One commonly-used QKD protocol is the BB84 protocol. It works by encoding a photon with a bit value of 1 or 0 and transmitting the encoded photon in one of two non-orthogonal basis states. The original implementation of the BB84 protocol achieved this by transmitting the photon in one of two non-orthogonal polarization states. The receiver measures the photon using a polarizer oriented to correspond with one of the two polarization states. If the orientation of the polarizers used by the transmitter and receiver are the same, the receiver will measure the correct encoded bit value. If they are different, the receiver will measure a random bit value.

Other ways of implementing BB84 have since been developed. In one implementation, two different phase states, rather than polarization states, are used. Both phase-based and polarization-based implementations involve costly equipment (such as polarization modulators). It would be desirable to find an alternative implementation that overcomes and/or mitigates some or all of the above-mentioned and/or other drawbacks of conventional approaches.

SUMMARY

According to a first aspect of the disclosure there is provided a method of performing Quantum Key Distribution, the method comprising quantum transmission in a first basis state and in a second basis state, the second basis state being non-orthogonal to the first basis state, from a quantum transmission apparatus to a quantum receiving apparatus over two pairs of optical channels, wherein transmitting in the first basis state comprises, at a first time slot, transmitting a photon over a first channel of the first pair and transmitting no photon over a second channel of the first pair, and, at a subsequent time slot, transmitting a photon over the first channel of the first pair, and transmitting a photon over the second channel of the first pair, wherein transmission in the second basis state comprises: transmitting a first portion of a probability distribution of a photon from the quantum transmission apparatus to the quantum receiving apparatus; and transmitting a second portion of a probability distribution of the photon from the quantum transmission apparatus to the quantum receiving apparatus.

The quantum transmission apparatus may comprise multiple single-photon transmitters. The quantum receiving apparatus may comprise multiple single-photon detectors.

The method may further comprise measuring in the first basis state. This may comprise directing a transmitted photon into a detector directly. This may be achieved using multiple switches. The method may further comprise measuring in the second basis state. This may comprise splitting a transmitted photon and directing the resulting probability distributions into detectors. This may be achieved using multiple switches.

The method may further comprise transmitting a first portion of a probability distribution of a further photon from the quantum transmission apparatus to the quantum receiving apparatus; and may further comprise transmitting a second portion of a probability distribution of the further photon from the quantum transmission apparatus to the quantum receiving apparatus.

The quantum transmission apparatus may, over multiple time slots, transmit multiple permutations of photons over the four optical channels. The method may further comprise assigning a value, which may be a binary value to each permutation. The binary value may be a two-bit binary value. The assigned value may be used, by both the quantum transmission apparatus and the quantum receiving apparatus in the key agreement.

There may be a phase difference between the first and the second portions of the probability distribution. The phase difference may be $\pi/2$. The method may further comprise using a splitter to split the photon into the first and the second portions of the probability distribution. The splitter may have a plurality of inputs. The method may further comprise inputting the second photon into a first input of the splitter or into a second input of the splitter. In some embodiments the splitter is a 2×2 splitter, however alternative embodiments are also envisaged. By 2×2 splitter, it is meant that the splitter has two inputs and two outputs. Inputting the second photon into the first input of the splitter may constitute encoding a bit value of 1 onto the second photon. Inputting the second photon into the second input of the splitter may constitute encoding a bit value of 0 onto the second photon. In either case, the phase of the output signal at one of the outputs of the splitter may lag that of the output signal put at the other output. This phase lag may be $\pi/2$.

The method may further comprise determining whether to transmit in the first basis state or the second basis state. This may involve the output of a random number generator. The method may further comprise encoding a bit value of 1 or 0 onto the first photon or the second photon. This may comprise determining the bit value to be encoded using a random number generator. Transmitting the first photon along the first optical channel may constitute transmitting a bit value of 1. Transmitting the first photon along the second optical channel may constitute transmitting a bit value of 0. The two pairs of optical channels may be located in a multi-core fiber. The multi-core fiber may have more than four channels and may have more than 6 channels and may have seven channels.

According to a second aspect of the disclosure there is provided a system for performing Quantum Key Distribution, the system comprising: a quantum transmission apparatus, a quantum receiving apparatus, two pairs of optical channels, the quantum transmission apparatus being adapted for quantum transmission to the quantum receiving apparatus in a first basis state and in a second basis state, the second basis state being non-orthogonal to the first basis state, over the two pairs of optical channels, wherein transmission in the first basis state comprises, at a first time slot, transmitting a photon over a first channel of the first pair and transmitting no photon over a second channel of the first pair, and, at a subsequent time slot, transmitting a photon over the first channel of the first pair, and transmitting a photon over the second channel of the first pair, wherein transmission in the second basis state comprises: transmitting a first portion of a probability distribution of a photon from the quantum transmission apparatus to the quantum receiving apparatus; and transmitting a second portion of a probability distribution of the photon from the quantum transmission apparatus to the quantum receiving apparatus.

BRIEF DESCRIPTION OF THE DRAWINGS

A specific embodiment of the disclosure will now be described, for illustration purposes only, and with reference to the appended drawings, in which.

DETAILED DESCRIPTION

Figure 1:
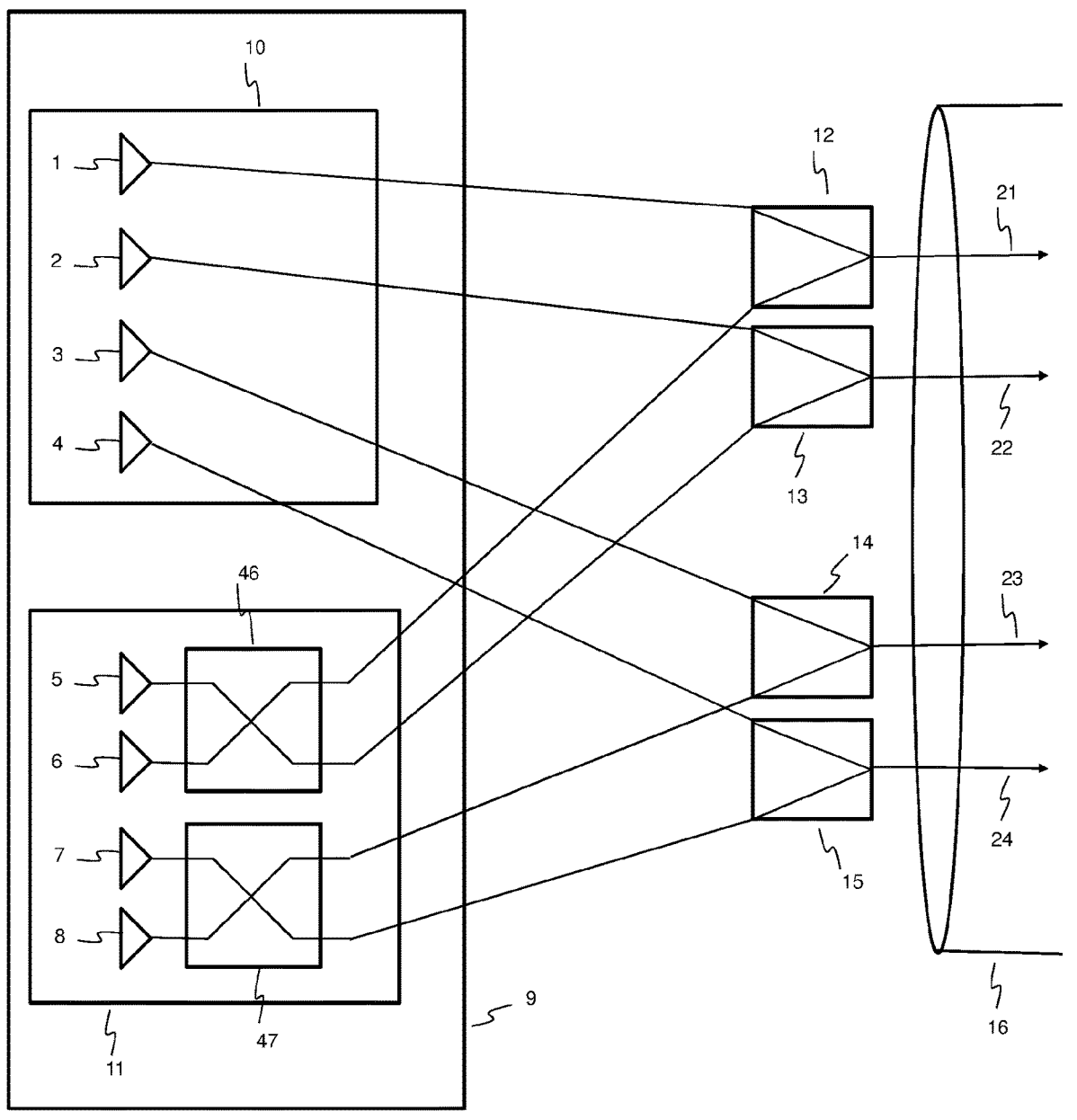
FIG. 1 is a schematic view of the Alice-side of a QKD system for use according to embodiments.

FIG. 1 shows an apparatus in accordance with the invention. In particular, FIG. 1 shows the Alice-side of an apparatus for performing QKD. Quantum transmitter unit 9, which will be referred to as Alice, contains eight single-photon transmitters, labelled 1-8 respectively. Transmitters 1-4 are located in a component which shall be referred to as first basis state unit 10. It is these transmitters that will be used to prepare photons in the first basis state. Transmitters 5-8 are located in a component which shall be referred to as second basis state unit 11. It is these transmitters that will be used to prepare photons in the second basis state.

Each of transmitters 1-4 are connected, by a respective optical fiber, to a respective switch 12-15. Transmitters 5-8 are also connected, via 2×2 splitters, to switches 12-15. The switches 12-15 each have a single output which is optically connected to a respective optical core within a multi-core optical fiber 16. In particular, switch 12 connects to core 21, switch 13 connects to core 22, switch 14 connects to core 23 and switch 15 connects to core 24. The switches 12-15 are each switchable between a first position, in which they connect to transmitters 1-4 of the first basis state unit 10, respectively, and a second position, in which they connect to transmitters 5-8 of the second basis state unit 11, respectively. The switches 12-15 are controllable by a controller which, for clarity reasons, is not shown.

Figure 2:
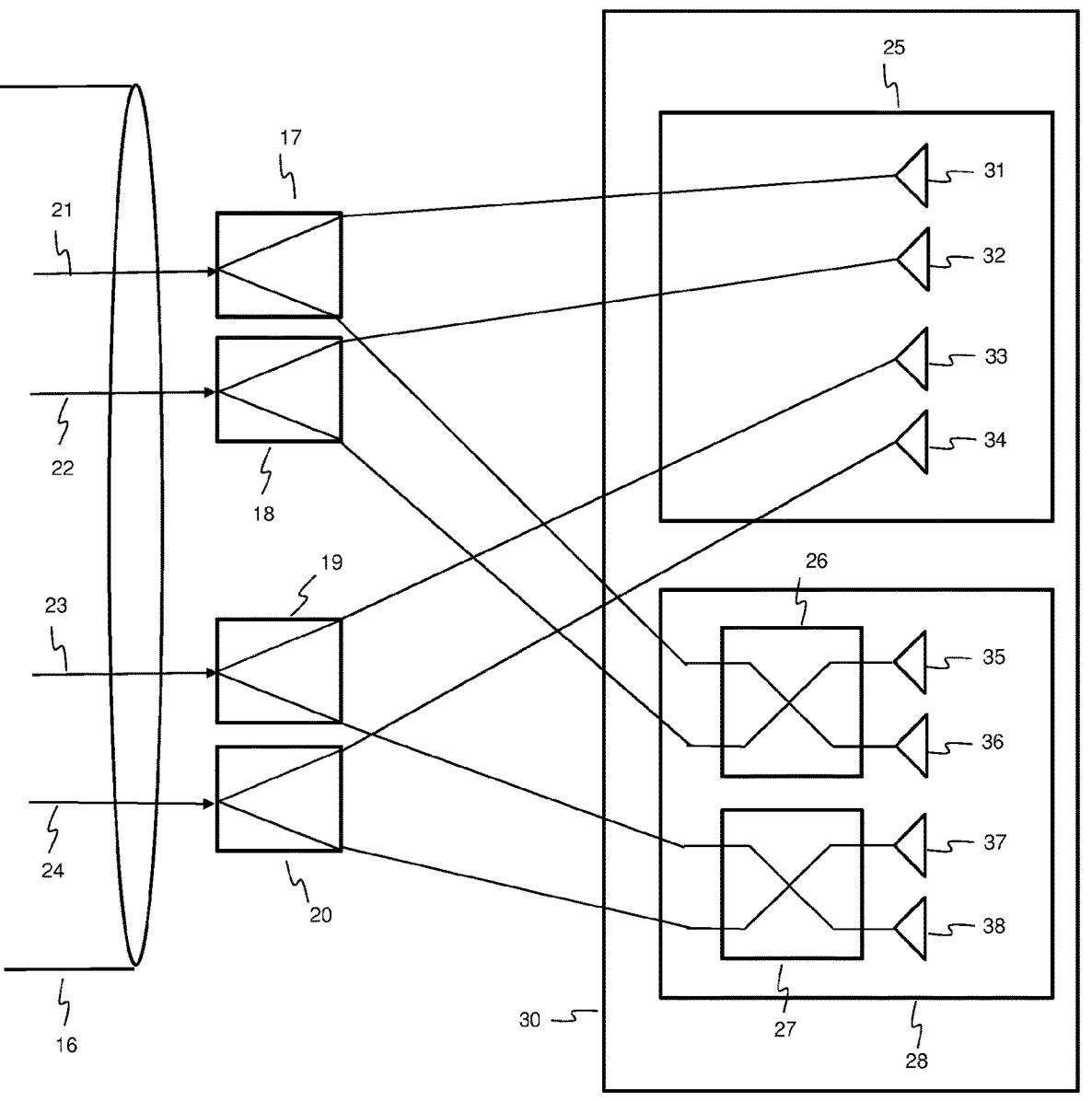
FIG. 2 is a schematic view of the Bob-side of a QKD system for use according to embodiments.

FIG. 2 shows the Bob-side of the QKD apparatus. Core 21 of multi-core fiber 16 connects to the single input of switch 17. Similarly, core 22 connects to switch 18, core 23 connects to switch 19 and core 24 connects to switch 20. One of the outputs of each of switches 17-20 has a direct optical fiber connection to a respective detector 31-34 within first basis state unit 25 of Bob 30. The other of the outputs of switches 17-20 has an optical fiber connection to an input 26 connect to detectors 35 and 36 respectively, and the two outputs of splitter 27 connect to detectors 37 and 38 respectively.

A method according to the disclosure will now be described. As in conventional prepare-and-measure QKD protocols, the data exchange comprises Alice transmitting a bit value of 1 or 0 in either first or second basis states. Which bit value Alice transmits and in which basis state she transmits it are chosen randomly using a random number generator (not shown).

Alice Uses BS1; Bob Uses BS1

If Alice chooses to transmit in a first basis state, she will use transmitters in the first basis state unit 10 and set the switch-set 12-15 to accept an input from transmitters 1-4. Say, in a particular time slot, Alice chooses to transmit a photon from transmitter 1. That photon will pass through switch 12 onto core 21. Thus a photon will arrive at switch 17 on the Bob-side. If Bob chooses to measure in the first basis state, he sets switch-set 17-20 to connect to the detectors in first basis state unit 25. Thus detector 31 registers a photon. Say, in the same slot, Alice chooses to transmit no photon from transmitter 2. Thus no photon is detected at detector 32.

The present QKD protocol requires that, at a given time slot, for each core that is used for the transmission of a photon, one core must be left unused. Therefore, in the same time slot, Alice may further transmit a photon from transmitter 3, which passes through switch 14 onto core 23. No photon will be transmitted by transmitter 4. Thus, detector 33 registers a photon and detector 34 registers no photon. This results in Permutation 1 shown in Table 1.

Alternatively, Alice could transmit photons from transmitters 1 and 4 and transmit no photons from transmitters 2 and 3. This would cause Bob's detectors 31 and 34 to fire, but not 32 or 33. This is permutation 2: (1,0,0,1). Similarly, Alice could transmit photons from transmitters 2 and 4 and transmit no photons from transmitters 1 and 3. This would cause Bob's detectors 32 and 34 to fire, but not 31 or 33. This is permutation 3: (0,1,0,1). Similarly, Alice could transmit photons from transmitters 2 and 3 and transmit no photons from transmitters 1 and 4. This would cause Bob's detectors 32 and 33 to fire, but not 31 or 34. This is permutation 4: (0,1,1,0).

Alternatively, Alice could transmit photons from transmitters 3 and 4 and transmit no photons from transmitters 1 and 2. This would cause Bob's detectors 33 and 34 to fire, but not 31 or 32. This is permutation 5: (0,0,1,1). Similarly, Alice could transmit photons from transmitters 1 and 2 and transmit no photons from transmitters 3 and 4. This would cause Bob's detectors 31 and 32 to fire, but not 33 or 34. This is permutation 6: (1,1,0,0).

Alice therefore has six possible permutations:

TABLE 1

| Transmitter no. | Perm. 1 | Perm. 2 | Perm. 3 | Perm. 4 | Perm. 5 | Perm. 6 |
|---|---|---|---|---|---|---|
| 1 | 1 | 1 | 0 | 0 | 0 | 1 |
| 2 | 0 | 0 | 1 | 1 | 0 | 1 |
| 3 | 1 | 0 | 0 | 1 | 1 | 0 |
| 4 | 0 | 1 | 1 | 0 | 1 | 0 |
| Abbreviation | (1, 0, 1, 0) | (1, 0, 0, 1) | (0, 1, 0, 1) | (0, 1, 1, 0) | (0, 0, 1, 1) | (1, 1, 0, 0) | of a 2×2 splitter within second basis state unit 28 of Bob 30. In particular, switch 17 connects to a first input of splitter 26, switch 18 connects to a second input of splitter 26, switch 19 connects to a first input of splitter 27 and switch 20 connects to a second input of splitter 27. The two outputs of splitter Alice and Bob have pre-assigned the first four permutations a two-bit binary value, i.e. one of 00, 01, 10, 11. Therefore, when Alice transmits, say, (0,1,1,0), she records the bit values she transmitted at that time slot as 11. Similarly, Bob records the bit values he detected at that time slot as 11. These will later be compared in the data exchange. Further values can be assigned to the two additional permutations (0,0,1,1) and (1,1,0,0).

Alice Uses BS1; Bob Uses BS2

Instead, Bob may measure the incoming photons using the wrong basis state, i.e. BS2. This would happen if he set his switch-set 17-20 to direct the incoming photons to the BS2 unit 28. This will result in the incoming photons being directed by switch-set 17-20 into the inputs of splitters 26 and 27. The splitters will split any incoming photons into two portions (each portion being a probability distribution) and outputs the portions to the two connected detectors. This will cause a random one of the connected detectors to fire. Thus, Bob will not necessarily record the correct bit value transmitted by Alice. Therefore measuring in the incorrect basis state introduces errors. This is a necessary feature of QKD.

Alice Uses BS2

Turning now to the case where Alice prepares photons in the second basis state and Bob chooses to measure in the second basis state. This is achieved on the Alice-side by setting switch set 12-15 to accept photons from second basis state unit 11. This is achieved on the Bob-side by setting switch set 17-20 to direct photons to second basis state unit 28.

The same six transmission permutations are available to Alice as were available when she was preparing photons in the first basis state. The only difference here is that Alice uses the transmitters in the second basis state unit 11, rather than the first basis state unit 10. These permutations are shown in Table 2.

At the lower output—two sub-portions with a phase difference of zero, resulting in constructive interference and so a photon is output at the lower output of splitter 26.

Thus, detector 36 will fire and detector 35 will not fire.

Also in Permutation 1, no photon is transmitted by transmitter 8 and so no photon is input to the lower input of splitter 47. Transmitter 7 transmits a photon which enters the upper input of splitter 47. Splitter 47 splits the photon into two "portions", i.e. probability distributions. The two portions are output at the two outputs. The phase of the portion output on the upper output of splitter 47 "leads" the phase of the portion output on the lower output of splitter 47 by π/2. This is a property of optical splitters. The two portions pass through switches 14 and 15 respectively, onto cores 23 and 24 respectively. On the Bob-side, the two portions are directed, by switches 19 and 20 respectively, to the respective inputs of splitter 27 of second basis state unit 28 of Bob. The phase of the portion at the upper input leads that of the portion at the lower input by π/2. The portion at the upper input is split by splitter 27 to produce two sub-portions. One of the sub-portions is output on each output of splitter 27. The sub-portion at the upper output leads that on the lower output by π/2. Similarly, the portion arriving at the lower input is split by splitter 27 to produce two sub-portions. One of the sub-portions is output, at each output of splitter 27. The sub-portion at the upper output leads that at the lower output by π/2. This results in:

At the upper output—two sub-portions with a phase difference of π, resulting in destructive interference and so no signal is output at the upper output of splitter 27; and

TABLE 2

| Transmitter no. | Perm. 1 | Perm. 2 | Perm. 3 | Perm. 4 | Perm. 5 | Perm. 6 |
|---|---|---|---|---|---|---|
| 5 | 1 | 1 | 0 | 0 | 1 | 0 |
| 6 | 0 | 0 | 1 | 1 | 1 | 0 |
| 7 | 1 | 0 | 0 | 1 | 0 | 1 |
| 8 | 0 | 1 | 1 | 0 | 0 | 1 |
| Abbreviation | (1, 0, 1, 0) | (1, 0, 0, 1) | (0, 1, 0, 1) | (0, 1, 1, 0) | (1, 1, 0, 0) | (0, 0, 1, 1) |

Permutation 1: (1,0,1,0)

In Permutation 1, no photon is transmitted by transmitter 6 and so no photon is input to the lower input of splitter 46. Transmitter 5 transmits a photon which enters the upper input branch of splitter 46. Splitter 46 splits the photon into two "portions", i.e. probability distributions. The two portions are output at the two outputs. The phase of the portion output on the upper output of splitter 46 "leads" the phase of the portion output on the lower output of splitter 46 by π/2. This is a property of optical splitters. The two portions pass through switches 12 and 13 respectively, onto cores 21 and 22 respectively. On the Bob-side, the two portions are directed, by switches 17 and 18 respectively, to the respective inputs of splitter 26 of second basis state unit 28 of Bob. The phase of the portion on the upper input leads that of the portion on the lower input by π/2. The portion on the upper input is split by splitter 26 to produce two sub-portions. One of the sub-portions is output on each output of splitter 26. The sub-portion at the upper output leads that on the lower output by π/2. Similarly, the portion arriving at the lower input is split by splitter 26 to produce two sub-portions. One is output at each output. The sub-portion directed to the upper output leads that directed to the lower output by π/2. This results in:

At the upper output—two sub-portions with a phase difference of π, resulting in destructive interference and no output at the upper output of splitter 26; and At the lower output—two sub-portions with a phase difference of zero, resulting in constructive interference and a photon is output at the lower output of splitter 27.

Thus, detector 38 will fire and detector 37 will not fire.

If Bob measures in the first (i.e. the incorrect) basis state, then the two portions on cores 21 and 22 will be directed by switches 17 and 18 directly into detectors 31 and 32. This will result in a random one of detectors 31 an 32 firing. This will therefore produce errors. Similarly the two portions on cores 23 and 24 will be directed by switches 19 and 20 directly into detectors 33 and 34. This will result in a random one of detectors 33 and 34 firing. This will produce errors.

Permutation 3: (0,1,0,1)

For further illustration, Permutation 3 will now be described.

In Permutation 3, no photon is transmitted by transmitter 5 and so no photon is input to the lower input of splitter 46. Transmitter 6 transmits a photon which enters the upper input of splitter 46. Splitter 46 splits the photon into two "portions", i.e. probability distributions. The two portions are output at the two outputs. The phase of the portion output on the lower output of splitter 46 "leads" the phase of the portion output on the upper output of splitter 46 by π/2. This is a property of optical splitters. The two portions pass through switches 12 and 13 respectively, onto cores 21 and 22 respectively. On the Bob-side, the two portions are directed, by switches 17 and 18, respectively, to the respective inputs of splitter 26 of second basis state unit 28 of Bob. The phase of the portion on the lower input leads that of the portion on the upper input by $\pi/2$. The portion on the upper input is split by splitter 26 to produce two sub-portions, one of which is output to each output of splitter 26. As a result of this splitting, the sub-portion at the upper output leads that at the lower output by $\pi/2$. Similarly, the portion arriving at the lower input is split by splitter 26 to produce two sub-portions, one is output to each output. As a result of this splitting, the sub-portion directed to the lower output leads that directed to the upper output by $\pi/2$. This results in:

At the lower output—two sub-portions with a phase difference of $\pi$, resulting in destructive interference and no output at the lower output; and, At the upper output—two sub-portions with a phase difference of zero, resulting in constructive interference and so a photon is output at the upper output of splitter 26.

Thus, detector 35 will fire and detector 36 will not fire.

Also in Permutation 3, no photon is transmitted by transmitter 7 and so no photon is input to the lower input of splitter 47. Transmitter 8 transmits a photon which enters the lower input of splitter 47. Splitter 47 splits the photon into two "portions", i.e. probability distributions. The two portions are output at the two outputs. The phase of the portion output on the lower output of splitter 47 "leads" the phase of the portion output on the upper output of splitter 47 by $\pi/2$. This is a property of optical splitters. The two portions pass through switches 14 and 15 respectively, onto cores 23 and 24, respectively. On the Bob-side, the two portions are directed, by switches 19 and 20 respectively, to the respective inputs of splitter 27 of second basis state unit 28 of Bob. The phase of the portion at the lower input leads that of the portion at the upper input by $\pi/2$. The portion at the upper input is split by splitter 27 to produce two sub-portions, one of the sub-portions being output to each output of splitter 27. The sub-portion at the upper output leads that at the lower output by $\pi/2$. Similarly, the portion arriving at the lower input is split by splitter 27 to produce two sub-portions, one of which is output at each output of splitter 27. The sub-portion at the lower output leads that at the upper output by $\pi/2$. This results in:

At the lower output—two sub-portions with a phase difference of $\pi$, resulting in destructive interference and so no signal is output at the lower output of splitter 27; and, At the upper output—two sub-portions with a phase difference of zero, resulting in constructive interference and a photon is output at the upper output of splitter 27.

Thus, detector 37 will fire and detector 38 will not fire.

If Bob measures in the first (i.e. the incorrect) basis state, then the two portions on cores 21 and 22 will be directed by switches 17 and 18 directly into detectors 31 and 32. This will cause a random one of detectors 31 and 32 to fire. This will therefore produce errors. Similarly the two portions on cores 23 and 24 will be directed by switches 19 and 20 directly into detectors 33 and 34. This will cause a random one of detectors 33 and 34 to fire. This will produce errors.

Permutation 2: (1,0,0,1) and Permutation 4: (0,1,1,0)

Permutations 2 and 4 follow straightforwardly from the above description of Permutations 1 and 3 and so a detailed description will not be given here. In summary, Permutation 2 has inputs (1,0,0,1) at Alice. If Bob measures in the second (i.e. the correct) basis state, detectors 36 and 37 will fire, but detectors 35 and 38 will not fire. Similarly, Permutation 4 has inputs (0,1,1,0) at Alice. If Bob measures in the second (i.e. the correct) basis state, detectors 35 and 38 will fire, but detectors 36 and 37 will not fire. If Bob measures in the first (i.e. the incorrect) basis state, Bob will measure random values.

Permutation 5: (1,1,0,0)

In Permutation 5, transmitter 5 and transmitter 6 both fire. Splitter 46 splits the photon into two "portions", i.e. probability distributions. The two portions are output at the two outputs. As a result, the upper output of splitter 46 has a leading portion (originating from transmitter 5) and a lagging portion (originating from transmitter 6). Similarly, the lower output of splitter 46 has a leading portion (originating from transmitter 6) and a lagging portion (originating from transmitter 6). The two signals pass onto cores 21 and 22, respectively, and are directed by switches 17 and 18 to the respective inputs of splitter 26.

Splitter 26 splits the signal arriving at its upper input and outputs it at its two outputs. This incoming signal has a portion which is leading and a portion which is lagging by $\pi/2$. Splitter 26 splits both of these, such that:

at its upper output, there is a sub-portion which is leading and a sub-portion which is lagging by $\pi/2$; and at its lower output, there is a sub-portion which is lagging by $\pi/2$ and a sub-portion which is lagging by $\pi$.

Furthermore, splitter 26 splits the signal arriving at its lower input and outputs it at its two outputs. This incoming signal has a portion which is leading and a portion which is lagging by $\pi/2$. Splitter 26 splits both of these, such that:

at its lower output, there is a sub-portion which is leading and a sub-portion which is lagging by $\pi/2$; and at its upper output, there is a sub-portion which is lagging by $\pi/2$ and a sub-portion which is lagging by $\pi$.

Thus, at the upper output of splitter 26 there is a sub-portion which is leading, a sub-portion which is lagging by $\pi/2$; a further sub-portion which is lagging by $\pi/2$ and a sub-portion which is lagging by $\pi$. This results in constructive and destructive interference, resulting in an output photon at the upper output, which causes detector 35 to fire. Similarly, at the lower output of splitter 26 there is a sub-portion which is leading, a sub-portion which is lagging by $\pi/2$; a further sub-portion which is lagging by $\pi/2$ and a sub-portion which is lagging by $\pi$. This results in constructive and destructive interference, resulting in an output photon at the lower output which causes detector 36 to fire.

As no photons are transmitted by transmitters 7 and 8, detectors 37 and 38 do not fire.

If Bob measures using the first (i.e. the incorrect) basis state, then the two portions on cores 21 and 22 will be directed by switches 17 and 18 directly into detectors 31 and 32. This will cause a random one of detectors 31 and 32 to fire. This will therefore produce errors.

Permutation 6: (0,0,1,1)

In Permutation 6, transmitter 7 and transmitter 8 both fire. Splitter 47 splits the each photon into two "portions", i.e. probability distributions. The two portions are output at the two outputs. As a result, the upper output of splitter 47 has a leading portion (originating from transmitter 7) and a lagging portion (originating from transmitter 8). Similarly, the lower output of splitter 47 has a leading portion (originating from transmitter 8) and a lagging portion (originating from transmitter 7). The two signals pass onto cores 23 and 24 respectively and are directed by switches 19 and 20 to the respective inputs of splitter 27.

Splitter 27 splits the signal arriving at its upper input and outputs it at its two outputs. This incoming signal has a portion which is leading and a portion which is lagging by π/2. Splitter 27 splits both of these, such that:

at its upper output, there is a sub-portion which is leading and a sub-portion which is lagging by π/2; and at its lower output, there is a sub-portion which is lagging by π/2 and a sub-portion which is lagging by π.

Furthermore, splitter 27 splits the signal arriving at its lower input and outputs it at its two outputs. This incoming signal has a portion which is leading and a portion which is lagging by π/2. Splitter 27 splits both of these, such that:

at its lower output, there is a sub-portion which is leading and a sub-portion which is lagging by π/2; and at its upper output, there is a sub-portion which is lagging by π/2 and a sub-portion which is lagging by π.

Thus, at the upper output of splitter 27 there is a sub-portion which is leading, a sub-portion which is lagging by π/2; a further sub-portion which is lagging by π/2 and a sub-portion which is lagging by π. This results in constructive and destructive interference, resulting in an output photon at the upper output, which causes detector 37 to fire. Similarly, at the lower output of splitter 27 there is a sub-portion which is leading, a sub-portion which is lagging by π/2; a further sub-portion which is lagging by π/2 and a sub-portion which is lagging by π. This results in constructive and destructive interference, resulting in an output photon at the lower output which causes detector 38 to fire.

As no photons are transmitted by transmitters 5 and 6, detectors 35 and 36 do not fire.

If Bob measures using the first (i.e. the incorrect) basis state, then the two portions on cores 23 and 24 will be directed by switches 19 and 20 directly into detectors 33 and 34. This will cause a random one of detectors 33 and 34 to fire. This will produce errors.

A summary of which of Bob's detectors at Bob are caused to fire by each permutation of transmissions at Alice are shown in Table 3 and Table 4. Table 3 shows the situation when both Alice and Bob use the first basis state. Table 4 shows the situation when both Alice and Bob use the second basis state. As mentioned above, prior to commencement of the quantum transmissions, Alice and Bob can assign each permutation a bit-value, e.g. a two-bit binary bit value. It is the bit value that is then used in the key agreement.

TABLE 3

| Transmitter/Detector No. | Permutation No. | | | | | |
|---|---|---|---|---|---|---|
| | 1 | 2 | 3 | 4 | 5 | 6 |
| 1 | 1 | 1 | 0 | 0 | 1 | 0 |
| 2 | 0 | 0 | 1 | 1 | 1 | 0 |
| 3 | 1 | 0 | 0 | 1 | 0 | 1 |
| 4 | 0 | 1 | 1 | 0 | 0 | 1 |
| 31 | 1 | 1 | 0 | 0 | 1 | 0 |
| 32 | 0 | 0 | 1 | 1 | 1 | 0 |
| 33 | 1 | 0 | 0 | 1 | 0 | 1 |
| 34 | 0 | 1 | 1 | 0 | 0 | 1 |

TABLE 4

| Transmitter/Detector No. | Permutation No. | | | | | |
|---|---|---|---|---|---|---|
| | 1 | 2 | 3 | 4 | 5 | 6 |
| 5 | 1 | 1 | 0 | 0 | 1 | 0 |
| 6 | 0 | 0 | 1 | 1 | 1 | 0 |
| 7 | 1 | 0 | 0 | 1 | 0 | 1 |
| 8 | 0 | 1 | 1 | 0 | 0 | 1 |
| 35 | 0 | 0 | 1 | 1 | 1 | 0 |

TABLE 4-continued

| Transmitter/Detector No. | Permutation No. | | | | | |
|---|---|---|---|---|---|---|
| | 1 | 2 | 3 | 4 | 5 | 6 |
| 36 | 1 | 1 | 0 | 0 | 1 | 0 |
| 37 | 0 | 1 | 1 | 0 | 0 | 1 |
| 34 | 1 | 0 | 0 | 1 | 0 | 1 |

The invention claimed is:

1. A method of performing Quantum Key Distribution, the method comprising:

quantum transmission in a first basis state and in a second basis state, the second basis state being non-orthogonal to the first basis state, from a quantum transmission apparatus to a quantum receiving apparatus over two pairs of optical channels, wherein transmission in the first basis state comprises, at a first time slot, transmitting a photon over a first channel of the first pair and transmitting no photon over a second channel of the first pair, and, at a subsequent time slot, transmitting a photon over the first channel of the first pair, and transmitting a photon over the second channel of the first pair, wherein transmission in the second basis state comprises:

transmitting a first portion of a probability distribution of a photon from the quantum transmission apparatus to the quantum receiving apparatus, and transmitting a second portion of a probability distribution of the photon from the quantum transmission apparatus to the quantum receiving apparatus; and wherein the quantum transmission apparatus, over multiple time slots, transmits multiple permutations of photons over the two pairs of optical channels.

2. The method as claimed in claim 1, wherein the quantum transmission apparatus comprises multiple single-photon transmitters.

3. The method as claimed in claim 1, wherein the quantum receiving apparatus comprises multiple single-photon detectors.

4. The method as claimed in claim 1, wherein the method further comprises assigning a binary value to each permutation.

5. The method as claimed in claim 4, wherein the binary value is a two-bit binary value.

6. The method as claimed in claim 1, wherein the assigned value is used, by both the quantum transmission apparatus and the quantum receiving apparatus, in a key agreement.

7. The method as claimed in claim 1, wherein there is a phase difference between the first portion and the second portion of the probability distribution.

8. The method as claimed in claim 7, wherein the phase difference is π/2.

9. The method as claimed in claim 1, wherein the two pairs of optical channels are optical fibers in the same multi-core optical fiber.

10. A system for performing Quantum Key Distribution, the system comprising:

a quantum transmission apparatus;

a quantum receiving apparatus; and two pairs of optical channels, the quantum transmission apparatus being adapted for quantum transmission to the quantum receiving apparatus in a first basis state and in a second basis state, the second basis state being non-orthogonal to the first basis state, over the two pairs of optical channels, wherein transmission in first basis state comprises, at a first time slot, transmitting a photon over a first channel of the first pair and transmitting no photon over a second channel of the first pair, and, at a subsequent time slot, transmitting a photon over the first channel of the first pair, and transmitting a photon over the second channel of the first pair, wherein transmission in the second basis state comprises:
  transmitting a first portion of a probability distribution of a photon from the quantum transmission apparatus to the quantum receiving apparatus, and
  transmitting a second portion of a probability distribution of the photon from the quantum transmission apparatus to the quantum receiving apparatus; and
wherein the quantum transmission apparatus, over multiple time slots, transmits multiple permutations of photons over the two pairs of optical channels.

11. A method of performing Quantum Key Distribution, the method comprising:
  quantum transmission in a first basis state and in a second basis state, the second basis state being non-orthogonal to the first basis state, from a quantum transmission apparatus to a quantum receiving apparatus over a plurality of optical channels, wherein transmission in the first basis state comprises, at a first time slot, transmitting a photon over a first channel of the of the plurality of optical channels and transmitting no photon over a second channel of the of the plurality of optical channels, and, at a subsequent time slot, transmitting a photon over the first channel, and transmitting a photon over the second channel, wherein transmission in the second basis state comprises:
  transmitting a first portion of a probability distribution of a photon from the quantum transmission apparatus to the quantum receiving apparatus, and
  transmitting a second portion of a probability distribution of the photon from the quantum transmission apparatus to the quantum receiving apparatus; and
wherein the quantum transmission apparatus, over multiple time slots, transmits multiple permutations of photons over the plurality of optical channels.

* * * * *